(12) United States Patent
Weiss et al.

(10) Patent No.: US 11,216,017 B2
(45) Date of Patent: Jan. 4, 2022

(54) DEVICE AND METHOD FOR FEEDING AN IMMERSION MEDIUM

(71) Applicant: Leica Microsystems CMS GmbH, Wetzlar (DE)

(72) Inventors: Alexander Weiss, Linden (DE); Sebastian Hitzler, Hohenahr-Erda (DE); Christian Schumann, Lich (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 51 days.

(21) Appl. No.: 16/835,449

(22) Filed: Mar. 31, 2020

(65) Prior Publication Data

US 2020/0319659 A1 Oct. 8, 2020

(30) Foreign Application Priority Data

Apr. 2, 2019 (DE) .......................... 102019108611.6

(51) Int. Cl.
| | |
|---|---|
| *G05D 9/12* | (2006.01) |
| *G02B 21/33* | (2006.01) |
| *G02B 21/02* | (2006.01) |
| *G05D 7/06* | (2006.01) |
| *G01N 27/22* | (2006.01) |

(52) U.S. Cl.
CPC ............. *G05D 9/12* (2013.01); *G01N 27/226* (2013.01); *G02B 21/02* (2013.01); *G02B 21/33* (2013.01); *G05D 7/0623* (2013.01)

(58) Field of Classification Search
CPC ...... G01N 27/226; G02B 21/02; G02B 21/33; G02B 21/248; G02B 21/30; G05D 9/12; G05D 7/0623; G05D 7/0676
See application file for complete search history.

(56) References Cited

U.S. PATENT DOCUMENTS

| | | | | |
|---|---|---|---|---|
| 3,837,731 A | * | 9/1974 | Amos ..................... | G02B 21/02 359/656 |
| 5,181,382 A | * | 1/1993 | Middlebrook ......... | G02B 21/28 219/201 |

(Continued)

FOREIGN PATENT DOCUMENTS

| | | |
|---|---|---|
| DE | 102006042499 A1 | 3/2008 |
| DE | 102006042088 B4 | 8/2011 |
| EP | 1777572 A1 | 4/2007 |

*Primary Examiner* — Hailey K. Do
(74) *Attorney, Agent, or Firm* — Leydig, Voit & Mayer, Ltd.

(57) ABSTRACT

A feed device for an immersion medium for use with an objective enabling a specimen to be imaged microscopically includes a cap fitted releasably or fixedly to the objective and delimiting a receptacle space for the immersion medium. The cap has an exit opening aligned with an optical element of the objective facing the specimen. The immersion medium held in the receptacle space is feedable through the exit opening to a target space situated between the optical element of the objective and the specimen. A sensor is integrated in the cap and has an electrode structure configured to detect an amount of the immersion medium fed through the exit opening to the target space. The electrode structure at least partly encloses the exit opening and has a spatial detection region extending away from the exit opening in a radial direction.

27 Claims, 10 Drawing Sheets

(56) References Cited

U.S. PATENT DOCUMENTS

| | | | | |
|---|---|---|---|---|
| 6,954,256 B2* | 10/2005 | Flagello | .............. | G03F 7/70958 |
| | | | | 355/53 |
| 6,980,293 B1 | 12/2005 | Harada | | |
| 2005/0179877 A1* | 8/2005 | Mulkens | ............ | G03F 7/70891 |
| | | | | 355/30 |
| 2006/0274424 A1* | 12/2006 | Okazaki | ............. | G02B 21/0088 |
| | | | | 359/661 |
| 2006/0275918 A1* | 12/2006 | Harada | .................. | G02B 21/33 |
| | | | | 436/174 |
| 2007/0291354 A1* | 12/2007 | Harada | ..................... | B01L 7/00 |
| | | | | 359/395 |
| 2010/0027109 A1* | 2/2010 | Liebel | ................ | G02B 27/0006 |
| | | | | 359/381 |
| 2015/0015943 A1* | 1/2015 | Scheps | ................... | G02B 21/33 |
| | | | | 359/398 |
| 2018/0259761 A1* | 9/2018 | Brinkman | .......... | G01N 21/6458 |
| 2020/0249456 A1* | 8/2020 | Lee | ........................ | G02B 21/33 |

\* cited by examiner

DEVICE AND METHOD FOR FEEDING AN IMMERSION MEDIUM

CROSS-REFERENCE TO PRIOR APPLICATIONS

Priority is claimed to German Patent Application No. DE 10 2019 108 611.6, filed on Apr. 2, 2019, the entire disclosure of which is hereby incorporated by reference herein.

FIELD

The invention relates to a feed device for an immersion medium for use with an objective enabling a specimen to be imaged microscopically. Furthermore, the invention relates to a method for feeding an immersion medium using a feed device.

BACKGROUND

In order to increase the numerical aperture in light microscopy, an immersion medium having a significantly higher refractive index than air is often introduced between the objective and the specimen to be examined. Such an immersion medium has the function of avoiding or at least reducing undesired light refractions which occur at the transition from the cover glass, which is part of the specimen to be examined, to the air and are directed away from the optical axis of the objective.

In order to introduce the immersion medium into the region between specimen and front lens of the objective, said region being referred to hereinafter as target space, the prior art discloses feed devices that operate with so-called immersion caps. Such an immersion cap is fitted releasably or fixedly to the objective and defines a receptacle space, into which the immersion medium is conveyed by means of a pump, for example. The immersion cap has an exit opening, which is aligned with the front lens of the objective and through which the immersion medium situated in the receptacle space is fed to the target space between the front lens of the objective and the specimen.

One example of a feed device of the type mentioned above is described in the document DE 10 2006 042 499 A1. Said feed device comprises an immersion cap having a sensor, which is intended to measure the amount of immersion medium at the objective. The sensor is embodied as a photocell, as a conductivity sensor or as a capacitive sensor. What is disadvantageous about said sensor is that, on account of its embodiment as a point sensor, it does not enable a precise measurement of the amount of immersion medium in the target space.

The document DE 10 2006 042 088 B4 discloses a feed device for an immersion medium, this feed device comprising a plate that can be plugged onto the objective and has a central exit opening aligned with the front lens of the objective. A channel passing into the exit opening extends within the plate, through which channel the immersion medium is fed to the exit opening. The exit opening is enclosed by two electrodes, which form a sensor for detecting the fed amount of immersion medium. The spatial detection region of said sensor is restricted to the exit opening. Consequently, immersion medium situated radially outside the exit opening is not detected.

With regard to the prior art, reference is furthermore made to the document EP 1 777 572 A1, which discloses an immersion cap having a heating device.

SUMMARY

In an embodiment, the present invention provides a feed device for an immersion medium for use with an objective enabling a specimen to be imaged microscopically. The feed device includes a cap fitted releasably or fixedly to the objective and delimiting a receptacle space for the immersion medium. The cap has an exit opening aligned with an optical element of the objective facing the specimen. The immersion medium held in the receptacle space is feedable through the exit opening to a target space situated between the optical element of the objective and the specimen. A sensor is integrated in the cap and has an electrode structure configured to detect an amount of the immersion medium fed through the exit opening to the target space. The electrode structure at least partly encloses the exit opening and has a spatial detection region extending away from the exit opening in a radial direction.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
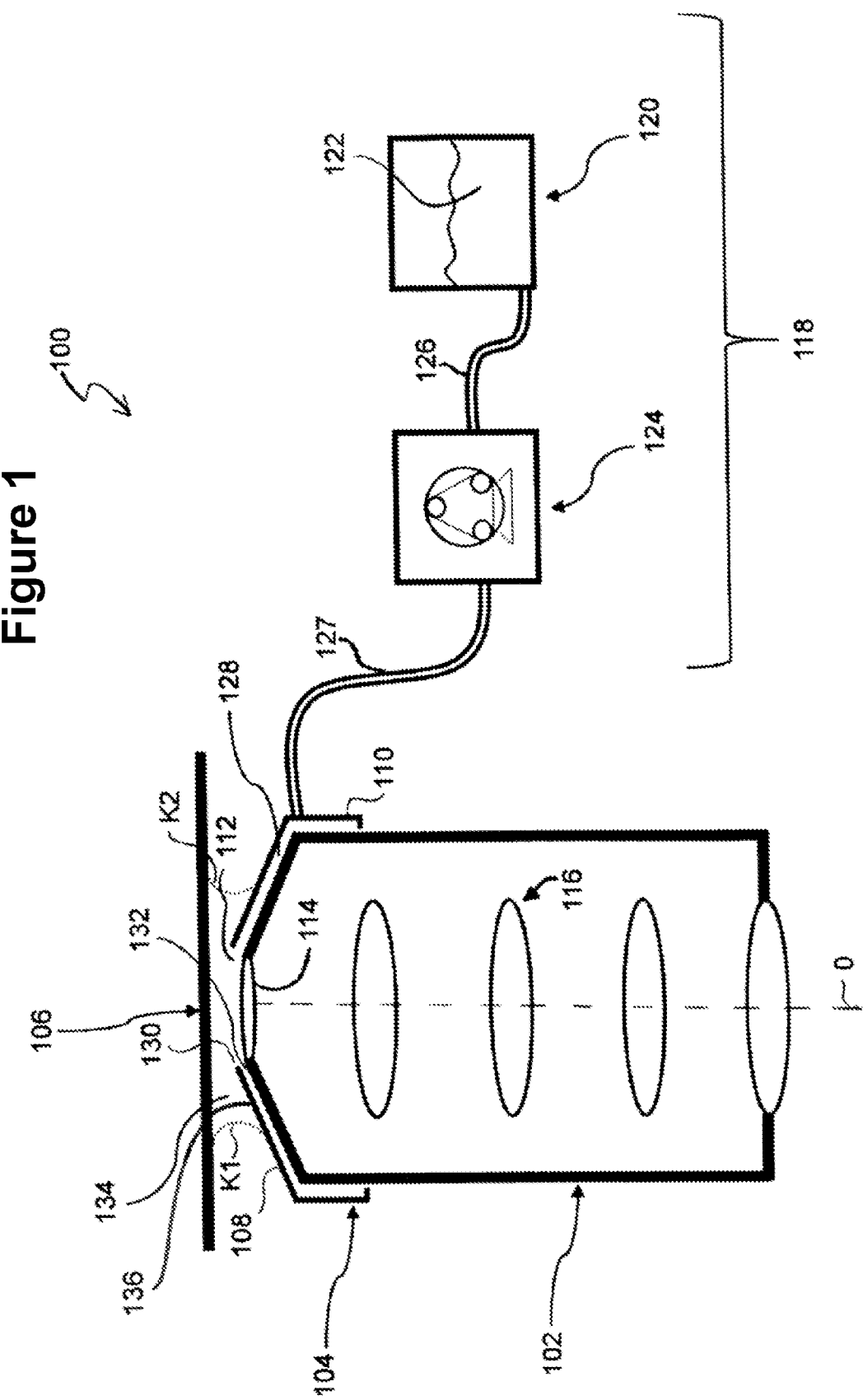
FIG. 1 shows a schematic illustration of a feed device for an immersion medium for use with an objective.

Embodiments of the present invention provide a device, an objective equipped therewith and also a method for feeding an immersion medium which make it possible to precisely detect the filling level of the immersion medium in a target region between objective and specimen.

An embodiment of the invention provides a feed device for an immersion medium for use with an objective enabling a specimen to be imaged microscopically. The feed device comprises a cap fitted releasably or fixedly to the objective and delimiting a receptacle space for the immersion medium, wherein the cap has an exit opening, which is aligned with an optical element of the objective facing the specimen and through which the immersion medium held in the receptacle space is able to be fed to a target space situated between the optical element of the objective and the specimen. The feed device furthermore comprises a sensor integrated in the cap and having an electrode structure for detecting the fed amount of immersion medium. The electrode structure at least partly encloses the exit opening and has a spatial detection region extending away from the exit opening in a radial direction.

By virtue of the fact that the spatial detection region at least also extends to the space situated radially outside the exit opening in a plan view of the cap, the target region between specimen and objective, which target region is detectable by the sensor, is significantly enlarged by comparison with the known solution, mentioned in the introduction, in which the immersion medium is detected only in the region of the exit opening. The liquid film formed by the immersion medium, on account of its extent beyond the exit opening e.g. in the event of lateral relative movements between objective and specimen, is significantly more robust than in measurement configurations in which the target region within which the liquid film is detected is restricted to the region of the exit opening. In this case, the abovementioned spatial detection region of the sensor is taken to mean that space between specimen and objective within which the sensor is sensitive to the immersion medium present there.

The radial enlargement of the spatial detection region of the sensor that is proposed in the present case additionally has the advantage that the amount of immersion medium detected by means of the sensor can be utilized as a stable controlled variable in order to set a desired target amount of immersion medium in the manner of a closed-loop control circuit. The radially expanded detection region within the target space thus makes available a tolerance zone preventing air from passing into the beam path extending between the objective and the specimen. The feed device with its electrode structure integrated in the cap thus affords the possibility of precisely controlling the amount of immersion medium.

The spatial detection region of the sensor can be designed, in particular, such that the filling level of the immersion medium is detected both in the receptacle space within the cap, i.e. in the region between cap and objective, and in the target space between objective and specimen. In this case, the detection signal generated by the sensor can be utilized as a measurement variable in order firstly to pump the immersion medium initially in an optimum amount into the cap and thus through the exit opening into the target space. Secondly, the measurement variable mentioned above allows this optimally set state to be maintained by continuous or discrete readjustment. As a result, it is possible to compensate for variations in the filling level of the immersion medium that are caused e.g. by evaporation or by a relative movement between specimen and objective.

The immersion medium can be for example water, oil, glycerol or other conventional media that provide for the desired increase in the refractive index in the target space between objective and specimen.

In one preferred embodiment, the senor is a capacitive or a resistive sensor. If the sensor is embodied as a capacitive sensor, then the electrode structure defining the sensor geometry is enclosed, e.g. potted, in an electrically insulating manner into the material forming the cap. In this case, the electrode structure comprises at least two electrodes which are electrically insulated from one another and which jointly act as a capacitor and the capacitance of which changes when the immersion medium is brought into the vicinity of the interspace separating the two electrodes from one another. In this embodiment, the two electrodes are connected to a suitable electronic measuring unit via contacts. By contrast, if the sensor is embodied as a resistive sensor, then the electrode structure forming the sensor in the cap is exposed toward the exterior, such that it can come into contact with the immersion medium. In the case of this resistive measurement, the electrode structure has at least two electrodes which are separated from one another and which are arranged on the cap such that the immersion medium, upon reaching a specific filling level, produces the electrical contact between the two electrodes and thus triggers a detection signal. In both embodiments, the electrode structures are connected to a suitable measuring unit in each case via two contacts.

The capacitive measurement has the advantage over the resistive measurement that it yields a continuous detection signal as the filling level changes, and it thus allows a quantitative amount or position determination that is particularly well suited to a closed-loop control of the filling level. Moreover, a capacitive measurement is independent of the conductivity of the immersion medium, said conductivity possibly varying.

In the case of a capacitive measurement, the electrode structure forming the sensor can also be utilized as a distance sensor that detects the distance to the specimen. In the case of a resistive measurement, the electrode structure can be used as a contact sensor.

Preferably, the cap has an end wall facing the specimen, the exit opening being formed in said end wall, wherein the end wall separates the receptacle space from the target space and the electrode structure is integrated into the end wall. In this embodiment, the electrode structure is situated in the region of the spatial separation between receptacle and target space, said spatial separation being realized by the end wall, which in particular also affords the possibility of performing a metrological separation of the two spaces mentioned above.

Preferably, the electrode structure of the capacitive sensor is electrically insulated by the end wall firstly from the receptacle space and secondly from the target space in such a way that the spatial detection region of the electrode structure covers at least the entire target space.

The electrode structure can additionally also be embodied such that its spatial detection region also covers the receptacle space.

In one preferred embodiment, the end wall has a first material layer, which electrically insulates the electrode structure of the capacitive sensor from the receptacle space, and a second material layer, which electrically insulates the electrode structure of the capacitive sensor from the target space. In this case, the sensitivity of the electrode structure to the amount of immersion medium fed to the receptacle space is determined by the thickness of the first material layer and the sensitivity of the electrode structure to the amount of immersion medium fed to the target space is determined by the thickness of the second material layer.

In one specific embodiment, the electrode structure of the sensor is insensitive to the amount of immersion medium situated in the exit opening. This insensitivity of the electrode structure in the region of the exit opening can be utilized for metrologically separating from one another the receptacle space and the target space, which are connected to one another via the exit opening of the cap. In this regard, the detection signal of the sensor does not change if, after the receptacle space has been completely filled, the immersion medium passes into the region of the exit opening and gradually fills up the latter before the filling level rises further as the immersion medium enters the target space. Thus, in the phase in which the immersion medium gradually fills the exit opening, the detection signal of the sensor remains at a constant value that can be used as a basis for performing the metrological separation between receptacle space and target space.

In an alternative embodiment, however, the electrode structure of the sensor can also be embodied such that it is sensitive to the amount of immersion medium situated in the exit opening. This can be realized for example in such a way that in addition to those electrodes which bring about the radial expansion of the spatial detection region of the sensor toward the outside away from the exit opening, the electrode structure comprises at least two further electrodes which lie furthest toward the inside in a radial direction within the electrode structure and directly enclose the exit opening. Since the exit opening of the cap is situated in the space between the electrodes mentioned above and these electrodes, like the other electrodes, also act as capacitor plates, the detection signal of the sensor varies if the amount of immersion medium in the region of the receptacle opening changes.

In one particularly preferred embodiment, the electrode structure is embodied as an interdigitated structure. Such an interdigitated structure is embodied for example such that in a defined plane situated within the cap material in the case of a capacitive measurement and on a surface of the cap in the case of a resistive measurement, finger-like electrode structures of the two electrodes involved closely intermesh without touching. In particular, such an interdigitated structure makes it possible, in a particularly simple manner, to make available a spatial detection region of the sensor which extends away from the exit opening radially in the desired manner.

Preferably, the exit opening is circular. In this case, the electrode structure preferably realized as an interdigitated structure is embodied rotationally symmetrically with respect to the exit opening in a plan view of the cap. If the electrode structure encloses the exit opening and thus the optical axis of the objective, then the amount of immersion medium can be concentrically averaged. As a result, only a single measurement value has to be determined, which is in turn advantageous if a radially symmetrical distribution of the immersion medium around the optical axis of the objective is taken as a basis.

In a further embodiment, the electrode structure can also have a plurality of mutually independently drivable electrode pairs distributed around the exit opening. It is thus possible, for example, to arrange a plurality of electrode pairs in a lateral plane that is perpendicular to the optical axis of the objective, said electrode pairs being arranged at identical angular distances from one another. In this regard, e.g. three of such electrode pairs can be arranged at angular distances of 120°. The provision of a plurality of individually evaluatable electrode structures makes it possible not only to detect the amount of immersion medium, but if appropriate also to detect an asymmetrical distribution of the immersion medium in the lateral plane mentioned above. This means that a positionally dependent detection of the immersion medium is possible in this embodiment.

In one particularly preferred embodiment, a measuring unit provided for the sensor is integrated in the cap. As a result of this integration of the measuring unit in the cap, electromagnetic interference signals which act on the connection between the electrodes and the measuring unit and corrupt the detection signal are largely avoided. However, it is likewise possible to provide the measuring unit outside the cap if this affords advantages in the specific application.

Preferably, the feed device comprises a conductor track structure integrated in the cap, said conductor track structure being electrically insulated from the receptacle space and the target space and being configured to resistively heat the immersion medium held in the receptacle space and/or in the target space. By way of example, it is possible to arrange this conductor track structure for heating the immersion medium within the end wall of the cap. The conductor track structure is formed e.g. from at least one continuously conductive conductor track which is insulated from the exterior and both ends of which are led out from the cap as connection contacts. In this case, the conductor track is embodied such that it constitutes an electrical resistance. If an electric current flows through the conductor track, then the latter heats up on account of said resistance and emits the resultant heat to the immersion medium via the cap material, preferably the end wall. Resistance heating for the immersion medium is provided in this way. This embodiment has considerable advantages over conventional solutions which involve heating primarily the objective but not directly the immersion medium in the relevant target space between objective and specimen. Specifically, while the objective constitutes a strong temperature sink on account of its comparatively large mass, in the present embodiment the cap, in particular the relatively thin end wall thereof, forms merely a weak temperature sink.

The conductor track structure for heating the immersion medium comprises for example at least one continuously conductive conductor track which is insulated from the exterior and both ends of which are led out from the cap as connection contacts. In this case, the conductor track is embodied such that it constitutes an electrical resistance. If an electric current flows through the conductor track, then the latter heats up on account of said resistance and emits the heat to the immersion medium via the cap material.

Preferably, the feed device comprises a temperature sensor for detecting the temperature of the immersion medium. The temperature sensor can be integrated in the cap, for example.

In one particularly preferred embodiment, the temperature sensor is formed by the above-described conductor track structure, which has a predetermined, temperature-dependent electrical resistance and is configured, alternately over time, to resistively heat the immersion medium held in the receptacle space and to resistively detect the temperature of said immersion medium. If the temperature-dependent electrical resistance of the electrode structure is known, then a temperature measurement can be realized by means of corresponding electronics. For this purpose, by way of example, platinum measuring resistors can be used as a conductor track structure. In particular, it is possible for the electrode structure used for heating the immersion medium to be embodied merely in the form of a single electrode, which then heats the immersion medium and detects the temperature thereof alternately over time. In order to obtain a sufficiently large electrical resistance on the smallest possible area and to achieve a good temperature distribution, the electrode structure is preferably embodied in meandering fashion. In particular, the electrode structure for heating the immersion medium can be embodied rotationally symmetrically with respect to the exit opening. It is likewise possible to provide a plurality of mutually independently drivable electrode pairs which serve for heating the immersion medium and are distributed around the exit opening at preferably identical angular distances.

The two conductor track structures, of which one serves for detecting the filling level of the immersion medium and the other serves for heating and optionally for temperature measurement, are spatially separated within the cap. By way of example, in a plan view of the cap, the two structures mentioned above are superimposed on one another, but arranged in different planes relative to the thickness direction of the cap. Alternatively or additionally, it is possible for the two structures to be arranged offset with respect to one another in a plan view of the cap.

Preferably, an edge of the end wall, the edge delimiting the exit opening, together with said optical element of the objective facing the specimen forms a gap through which the immersion medium emerges into the target space. The, preferably ring-shaped, gap formed in this way makes it possible to cover the optical element with the immersion medium in a particularly simple manner.

The end wall preferably extends substantially conically toward the exit opening. However, it is likewise possible for the end wall to have a horizontal orientation, i.e. an orientation perpendicular to the optical axis of the objective.

The cap has for example a substantially cylindrical wall adjacent to the end wall, said cylindrical wall together with the end wall delimiting the receptacle space for the immersion medium. In this way, the cap can be fitted to the objective releasably in a particularly simple manner.

Preferably, the feed device comprises a pump system, which is connected to the receptacle space of the cap via at least one tube and is configured to pump the immersion medium into the receptacle space. The pump system is for example part of a supply system comprising a reservoir container, from which the pump system conveys the immersion medium into the receptacle space. The pump system is embodied e.g. as a pump having feed and returning capability. However, the pump system can also be composed of two separate pump units for feed and return or be embodied in the form of a double-headed pump. The immersion medium to be disposed of can be guided back into the reservoir container for reuse or else be guided into a further container for disposal.

The supply system mentioned above can be arranged on an objective turret, for example. However, it is likewise possible for the supply system to be provided remotely from the microscope or to be integrated into the microscope housing. It is likewise possible to spatially separate the components of the supply system from one another, i.e. e.g. to provide the pump on the objective turret and the reservoir container remotely from the microscope.

Preferably, an open-loop/closed-loop control unit is provided, which ensures that the immersion medium is pumped into the receptacle space depending on a detection signal supplied by the sensor. If resistance heating is simultaneously present in the immersion cap, the open-loop/closed-loop control unit can also perform the temperature regulation thereof.

According to a further embodiment of the invention, a method for feeding an immersion medium using a feed device of the type explained above is provided. In the method, the immersion medium is pumped into the receptacle space by means of the pump system and a detection signal corresponding to the fed amount of immersion medium is simultaneously generated by means of the sensor, on the basis of which detection signal the pump system is controlled for setting a target amount of immersion medium.

With application of this method, the sensor is preferably embodied as a capacitive sensor. As such it is able to continuously detect the filling level of the immersion medium. Firstly, this enables an automated initial setting of an optimum target amount of immersion medium in the target space. Secondly, the continuous filling level detection can subsequently be utilized to keep said optimum target amount constant in the manner of a closed-loop control circuit.

Preferably, the immersion medium is pumped into the receptacle space at a constant pump rate. This facilitates, in particular, the initial setting of the target amount of immersion medium.

For defining the target amount, for example, firstly the amount for which the immersion medium reaches the exit opening of the cap is detected as reference amount and then the target amount is determined on the basis of said reference amount.

In one preferred embodiment, the closed-loop control of the fed amount of immersion medium is suspended within a predetermined tolerance range around the target amount and/or when a predetermined operating state is present. Such an operating state is manifested e.g. when an alteration of the contact area covered by the immersion medium at the cap and/or the specimen occurs during an experiment owing to a focusing adjustment, for instance. It is then advantageous to interrupt the closed-loop control of the amount of immersion medium until the focusing adjustment has stopped. On the basis of the detection signal of the sensor that is then present, the closed-loop control can subsequently be restarted in order to achieve the desired amount of immersion medium.

In a further embodiment, the invention provides an objective comprising a feed device of the type described above.

FIG. 1 shows a schematic illustration of a feed device 100 constituting one exemplary embodiment of the present invention.

The feed device 100 is intended for joint use with an objective 102 that is part of a microscope. The feed device 100 comprises an immersion cap 104, which is fitted releasably or fixedly to the objective 102. In this case, the immersion cap 104 is situated at a front end of the objective 102 facing a specimen 106. The specimen 106 comprises a sample and also a sample carrier, which can be embodied for example as cover glass or slide or else as microtiter plate.

Figure 2:
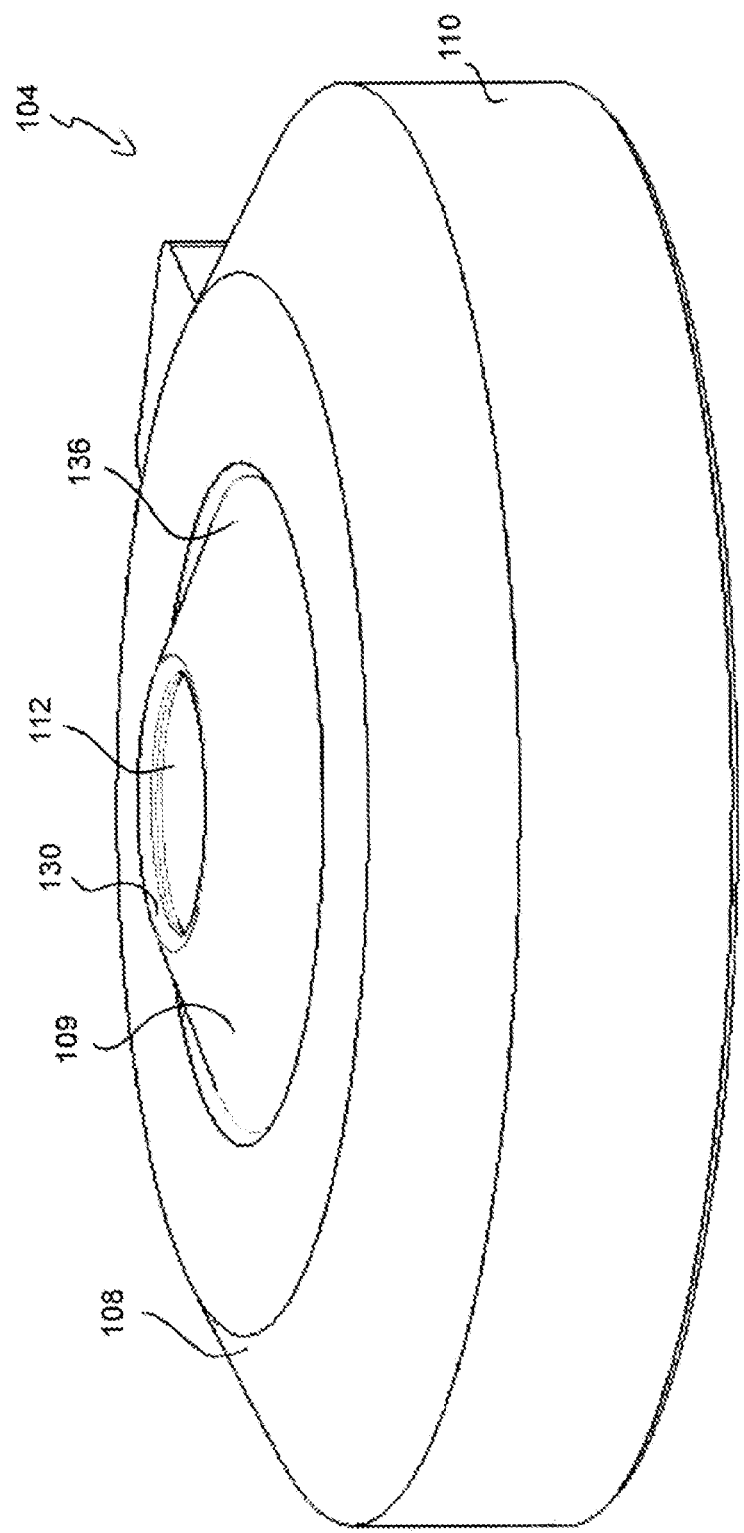
FIG. 2 shows a perspective view of an immersion cap that is able to be fitted to the objective.
Figure 3:
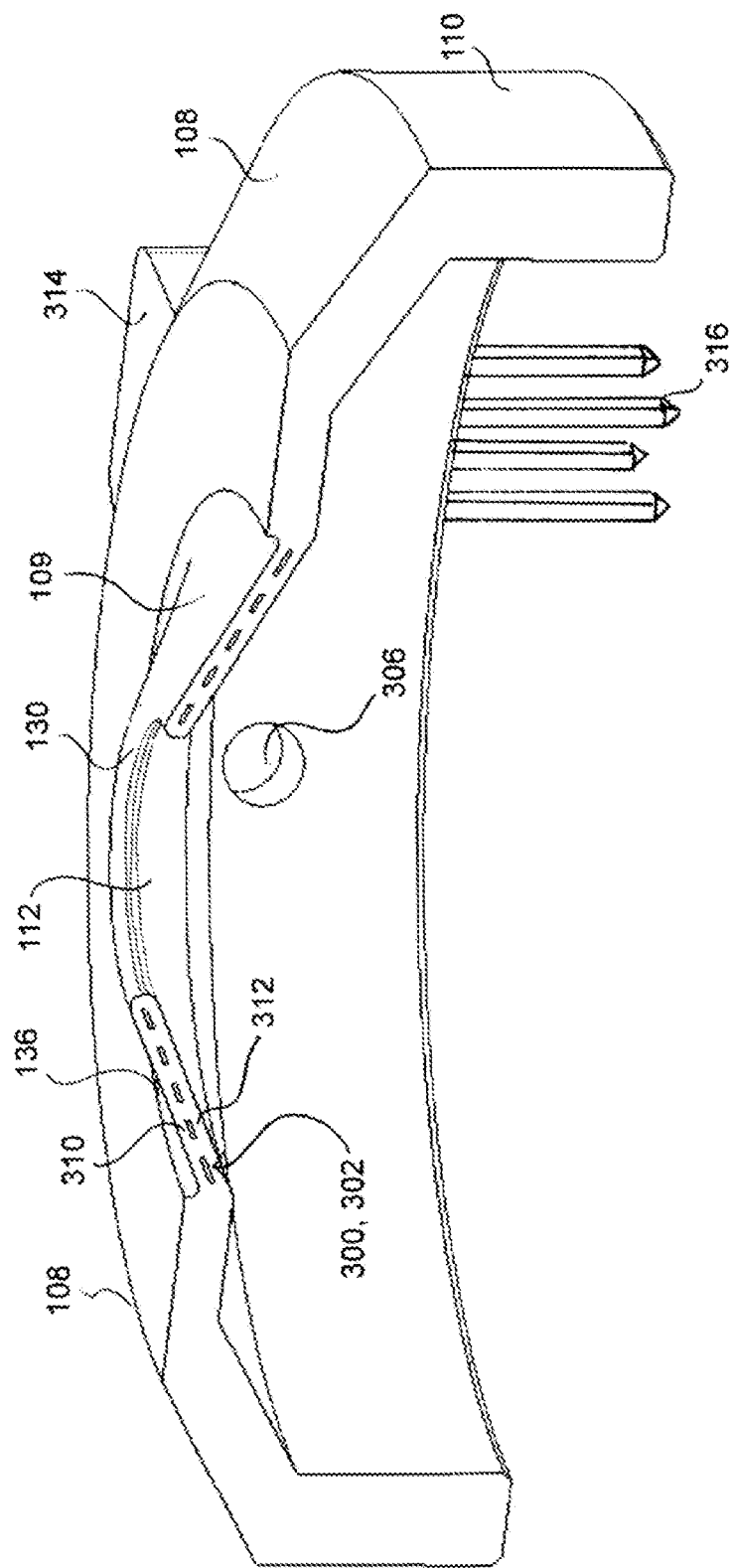
FIG. 3 shows a sectional view of the immersion cap according to FIG. 2.

As shown in more specific detail in FIGS. 2 and 3, the immersion cap 104 has an end wall 108 having a conically tapering end section 109, said end wall facing the specimen 106, and also a cylindrical wall 110 adjacent to the end wall 108. Both the end wall 108 and the wall 110 adjacent thereto are adapted to the outer contour of the objective 102 in terms of their shaping. This makes it clear that the immersion cap 104 is not intended to be restricted to the shaping illustrated in the figures.

In the exemplary embodiment shown, the end wall 108 has a central exit opening 112 in its conically tapering end section 109, said exit opening preferably being embodied as circular in a plan view of the immersion cap 104. The exit opening 112 is aligned with a front lens 114 facing the specimen 106, said front lens likewise being embodied as circular and being part of a lens system 116 contained in the objective 102.

The feed device 100 furthermore comprises a supply system 118 having a reservoir container 120 for receiving an immersion medium 122, e.g. water, oil or glycerol, and a pump system 124 connected to the reservoir container 120 via a tube 126. The pump system 124 is furthermore coupled to the immersion cap 104 via a further tube 127. It serves to pump the immersion medium 122 from the reservoir container 120 into a receptacle space 128 delimited by the interior of the immersion cap 104 fitted to the objective 102.

If the immersion medium 122 is conveyed into the interior of the immersion cap 104 by means of the pump system 124, then it gradually fills the receptacle space 128 until it reaches the region of a circular edge 130 of the end wall 108 delimiting the exit opening 112. Said edge 130 of the end wall 108 together with the front lens 114 of the objective 102 forms a gap 132 extending circumferentially in a ring-shaped fashion, through which gap the immersion medium 122 firstly completely wets the surface of the front lens 114 facing the specimen 106 and subsequently exits through the exit opening 112 into a target space 134 situated between the front lens 114 and the specimen 106. In this case, the amount of immersion medium 122 pumped into the immersion cap 104 is sufficient for the immersion medium 122 to completely cover not only the front lens 114 but also parts of an outer surface 136 of the end wall 108 which extend away from the exit opening 112 in a radial direction. In a plan view of the objective 102, the target space 134 filled with the immersion medium 122, relative to the optical axis O of the objective 102, thus has a radial extent which is significantly greater than the radial extent of the exit opening 112. This ensures that the beam path passing along the optical axis O to the specimen 106 is always situated completely within the immersion medium 122, such that no air can pass into the beam path and hinder the desired refractive index matching there.

As becomes clear from the above explanations, the end wall 108 separates the receptacle space 128 present in the interior of the immersion cap 104 from the target space 134 lying outside the immersion cap 104. In the illustration according to FIG. 1, therefore, the target space 134 is delimited in a radial direction by the two curved lines designated by K1 and K2, respectively, while the target space 134 is delimited in a vertical direction, i.e. along the optical axis O of the objective 102, firstly by the underside of the specimen 106 and secondly by a plane in which the exit opening 112 lies.

As shown in the sectional illustration of the immersion cap 104 in accordance with FIG. 3, the feed device 100 comprises a capacitive sensor 300 integrated in the immersion cap 104, said capacitive sensor being formed by an electrode structure 302 potted in the end wall 108 in the present exemplary embodiment. The sensor 300 has the function of detecting the amount of immersion medium 122 pumped by the pump system 124 into the interior of the immersion cap 104 via a feed opening 306 embodied in the wall 110. In this case, the electrode structure 302 forming the sensor 300 is arranged within the end wall 108 of the immersion cap 104 in such a way that the spatial detection region of the sensor 300, in a manner corresponding to the target space 134 illustrated in FIG. 1, extends outward away from the exit opening 112 in a radial direction, i.e. transversely with respect to the optical axis O of the objective 102. This means that the electrode structure 302 can in any case also detect the immersion medium 122 situated in the target space 134 outside the exit opening 112 in a radial direction. However, this is not intended to exclude the fact that the spatial detection region of the electrode structure 302 also covers regions of the target space 134 radially inside the exit opening 112, i.e. the electrode structure 302 is also sensitive to the immersion medium 122 present there.

Figure 4:
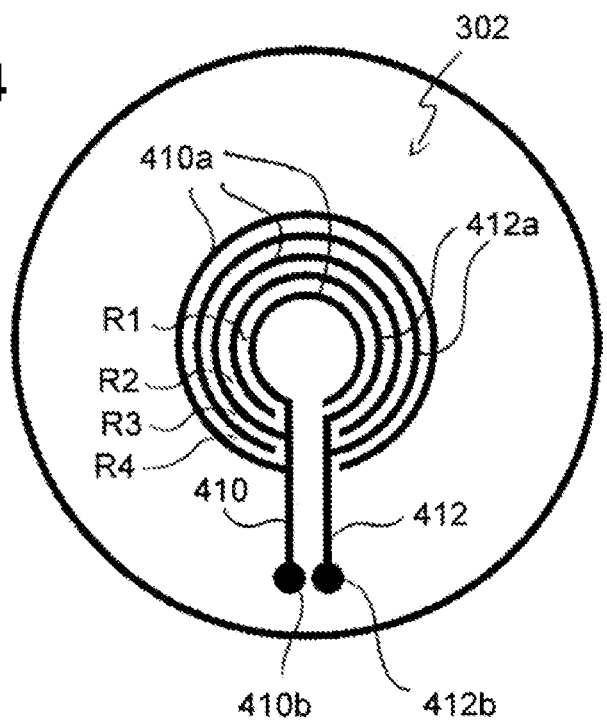
FIG. 4 shows a schematic illustration of an electrode structure integrated in the cap for detecting the fed amount of immersion medium in one specific embodiment.

As is shown in FIG. 3 in conjunction with the plan view according to FIG. 4, which illustrates a purely schematic sectional view, the electrode structure 302 in the present embodiment is formed from a pair of electrodes 410, 412, which form in their entirety an interdigitated structure. In this case, each electrode 410, 412 has a plurality of electrode sections 410a and 412a, respectively, which extend concentrically with respect to one another and which are led around the exit opening 112 concentrically at different radial distances in a closely adjacent manner. In this case, the electrode sections 410a of the electrode 410 and the electrode sections 412a of the electrode 412 form finger-like structures which mutually intermesh without touching one another.

In the example according to FIG. 4, this mutual intermeshing of the two electrodes 410, 412 subdivides the spatial detection region of the sensor 300 into four radial subregions R1, R2, R3 and R4, wherein the innermost subregion R1 is at the smallest radial distance from the exit opening 112 and the outermost subregion R4 is at the largest radial distance from said exit opening. Each of said subregions R1 to R4 is situated between one of the electrode sections 410a of the electrode 410 and the adjacent electrode section 412a of the second electrode 412, wherein the two electrode sections 410a, 412b mentioned above act as capacitor plates. If there is a change in the amount of immersion medium 122 in the direct vicinity of the respective subregion R1 to R4, then this change is detected on the basis of a corresponding variation of the detection signal supplied by the electrode structure 302.

As can be gathered from the cross-sectional view according to FIG. 3, the end wall 108 has a first material layer 312 below the electrode structure 302 and a second material layer 310 above the electrode structure 302. The first material layer 312 electrically insulates the electrode structure 302 from the receptacle space 128 situated in the interior of the immersion cap 104. By contrast, the second material layer 310 electrically insulates the electrode structure 302 from the target space 134 situated outside the immersion cap 104. The sensitivity of the electrode structure 302 vis-à-vis the amount of immersion medium 122 fed to the receptacle space 128 is determined by the thickness of the first material layer 312. Correspondingly, the sensitivity of the electrode structure 302 vis-à-vis the amount of immersion medium 122 fed to the target space 134 is determined by the thickness of the second material layer 310.

Since the end wall 108 itself has only a thickness of a few tenths of a millimeter in order to fit into the space between objective 102 and specimen 106, the two material layers are correspondingly thin. They thus form a thinly embodied insulating covering of the electrode structure 302, such that the electrode structure 302, both toward the receptacle space 128 and toward the target space 134, is sensitive to the amount of immersion medium 122 respectively present there. By virtue of the fact that the electrode structure 302 concentrically encloses the exit opening 112 and thus the optical axis O of the objective 102, the amount of immersion medium 122 in the receptacle space 128 and/or the target space 134 is detected in an averaged manner concentrically. Consequently, only a single measurement value has to be determined with the use of the electrode structure 302 shown in FIGS. 3 and 4.

As is furthermore shown in FIG. 3, the immersion cap 104 has an integrated electronic measuring unit 314. The latter is connected to connection contacts 410*b*, 412*b* of the two electrodes 410, 412, said connection contacts being shown in FIG. 4, and, via connection pins 316, forwards the detected detection signals to an open-loop/closed-loop control unit.

While the capacitively measuring electrode structure 302 in accordance with FIGS. 3 and 4 has only a single pair of electrodes 410, 412 and accordingly detects only a single measurement value, the electrode structure in a modified embodiment can have a plurality of individually drivable electrode pairs, which in their entirety supply a number of measurement values corresponding to the number of electrode pairs. One example of this is illustrated in FIGS. 5 and 6.

Figure 5:
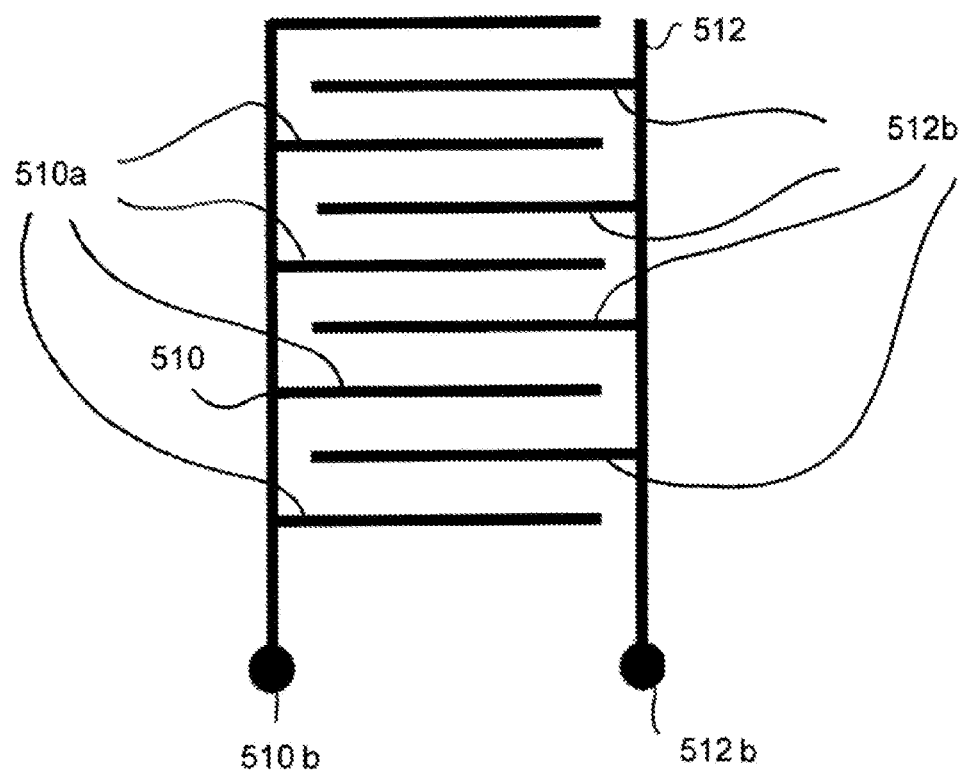
FIG. 5 shows a schematic illustration of an individually drivable electrode pair which is part of an electrode structure in accordance with a further embodiment.

The schematic illustration according to FIG. 5 shows a pair of electrodes 510, 512, each of which has a connection contact 510*b* and 512*b*, respectively, and also a plurality of finger-like electrode sections 510*a* and 512*a*, respectively. In this case, the finger-like electrode sections 510*a*, 512*a* of the two electrodes 510, 512 once again intermesh in the manner of an interdigitated structure, without touching one another. The electrode pair 510, 512 illustrated in FIG. 5 forms an individually drivable substructure that supplies a single measurement value related to the detected amount of immersion medium 122.

Figure 6:
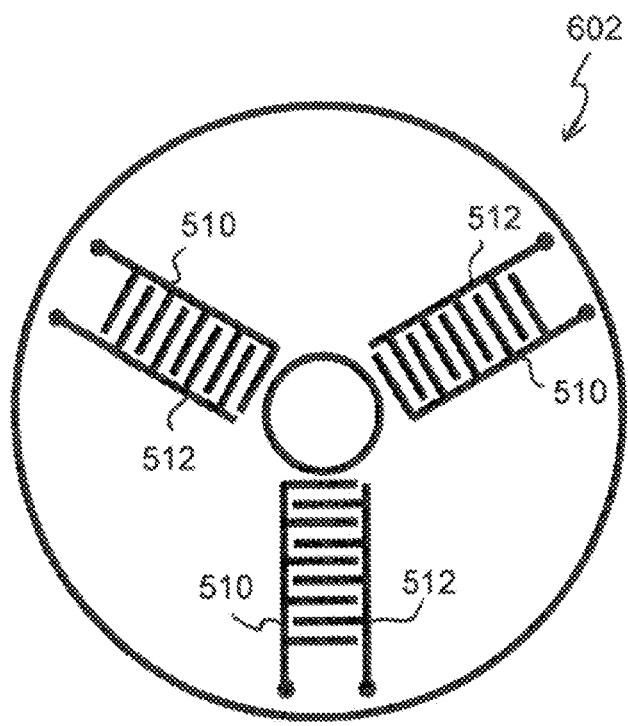
FIG. 6 shows a schematic illustration of an electrode structure having a plurality of electrode pairs in accordance with FIG. 5.

FIG. 6 shows a capacitively measuring electrode structure 602, which can be composed of a plurality of substructures of the type shown in FIG. 5. In the example according to FIG. 6, three electrode pairs 510, 512 are arranged at angular distances of 120° around the exit opening 112 and thus the optical axis O of the objective 102, wherein each of the electrode pairs 510, 512 extends outward away from the exit opening 112 in a radial direction. The three electrode pairs 510, 512, which are electrically isolated from one another, supply three detection signals, on the basis of which it is possible to detect not only the amount of immersion medium 122 but also the possibly asymmetrical distribution thereof in the lateral plane, i.e. the plane lying transversely with respect to the optical axis O of the objective 102.

The embodiments of the electrode structure explained above with reference to FIGS. 3 to 6 are embodied such that they are insensitive to the amount of immersion medium 122 situated in the exit opening 112. This is owing to the fact that none of these embodiments has a capacitively measuring substructure which encloses the exit opening 112 and is thus sensitive to the immersion medium 122 situated there. However, it is likewise possible to embody the capacitive sensor such that its spatial detection region also covers the exit opening 112 in a radial direction, that is to say that the sensor is also sensitive to the amount of immersion medium 122 inside the exit opening 112. For this purpose, the structures illustrated in FIGS. 3 to 6 can be supplemented for example by a pair of electrodes 710, 712, such as are illustrated in FIG. 7.

Figure 7:
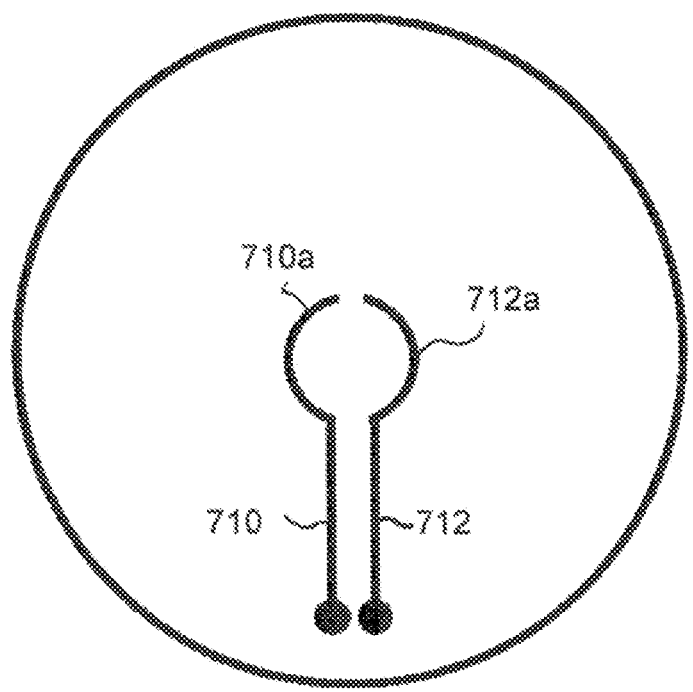
FIG. 7 shows a schematic illustration of an additional electrode pair, which is sensitive to the amount of immersion medium situated in the exit opening.

In the example according to FIG. 7, the two electrodes 710, 712 respectively have a semi-circular electrode section 710*a*, 712*a*, which is led around the exit opening 112. In their entirety the two electrode sections 710*a*, 712*b* thus circularly enclose the exit opening 112 and thus enable a capacitive measurement of the amount of immersion medium 122 present between them.

In addition to having the electrode structure forming the capacitive sensor for detecting the filling level of the immersion medium 122, the immersion cap 104 can have an integrated conductor track structure, which is electrically insulated from the receptacle space 128 and the target space 134 and is configured to heat the immersion medium 122 resistively, i.e. in the manner of electrical resistance heating. One example of such a conductor track structure is shown in the schematic illustration according to FIG. 8.

Figure 8:
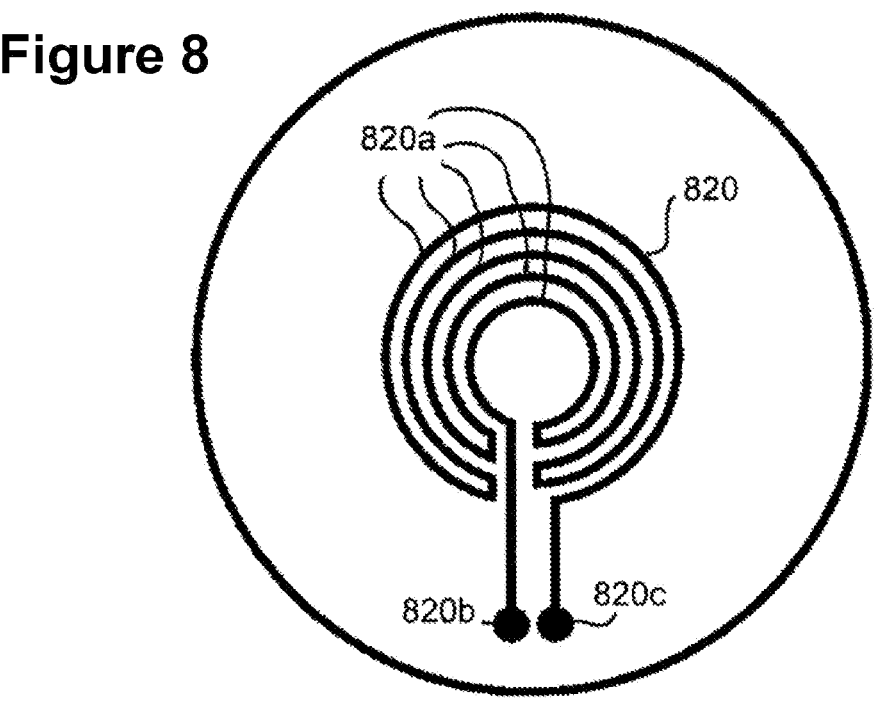
FIG. 8 shows a schematic illustration of a conductor track structure integrated in the cap for resistively heating the immersion medium in one specific embodiment.

In the embodiment according to FIG. 8, a conductor track structure intended for heating the immersion medium 122 is formed from a single, continuously conductive conductor track 820, the two ends of which are led out from the immersion cap 104 as connection contacts 820*b*, 820*c*. The conductor track 820 is embodied such that it constitutes an electrical resistance, as a result of which an electric current flowing through the conductor track 820 heats the latter. The conductor track 820 heated in this way passes its heat to the cap material into which the conductor track 820 is embedded, and thus further to the immersion medium 122 adjoining the latter.

In the embodiment according to FIG. 8, the conductor track has a plurality of conductor track sections 820*a*, which concentrically enclose the exit opening 112 in different radial sections. In this case, taking account of the thickness of the material layers of the immersion cap 104, which electrically insulate the conductor track 820 from the receptacle space 128 and respectively from the target space 134, the conductor track 820 can be embodied such that it heats the immersion medium 122 only in the receptacle space 128, only in the target space 134 or else in both of the aforementioned spaces.

The conductor track according to FIG. 8 can also be embodied such that it has a predetermined temperature-dependent resistance, with knowledge of which a temperature measurement can be realized. For this purpose, the conductor track 820 forms a platinum measuring resistor, for example. In the embodiment according to FIG. 8, which provides only a single conductor track as resistance heating, such a temperature measurement is preferably to be implemented such that the conductor track 820 performs the temperature measurement and the resistive heating of the immersion medium 122 alternatively over time. Periods of the heating and periods of the temperature measurement thus alternate.

Owing to its conductor track sections 820*a* intermeshing in a meandering fashion, the concentric conductor track structure shown in FIG. 8 makes it possible to provide a sufficiently large electrical resistance on the smallest possible area, with the result that a good temperature distribution is achieved. However, such a preferred meandering embodiment can also be achieved in a different way, for example with a structure such as is shown in FIGS. 9 and 10.

Figure 9:
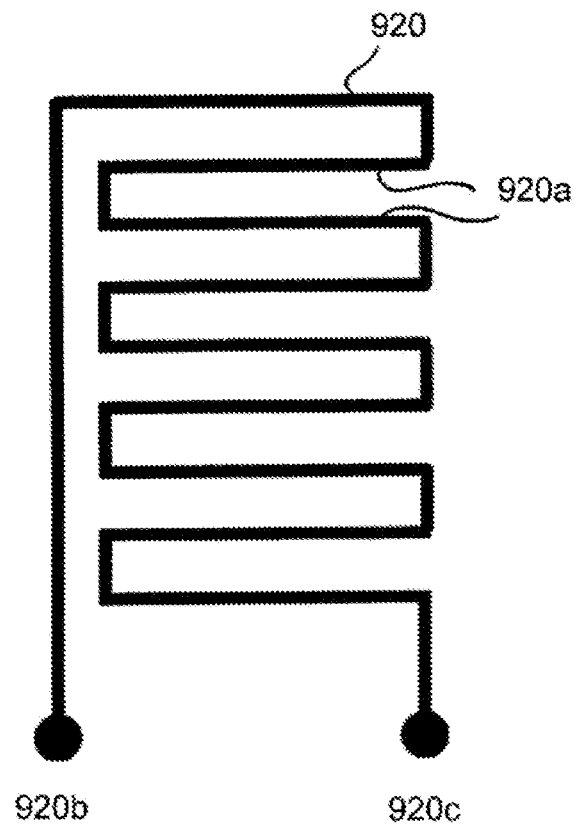
FIG. 9 shows a schematic illustration of an individually drivable conductor track that is part of a conductor track structure intended for heating the immersion medium in accordance with a further embodiment.
Figure 10:
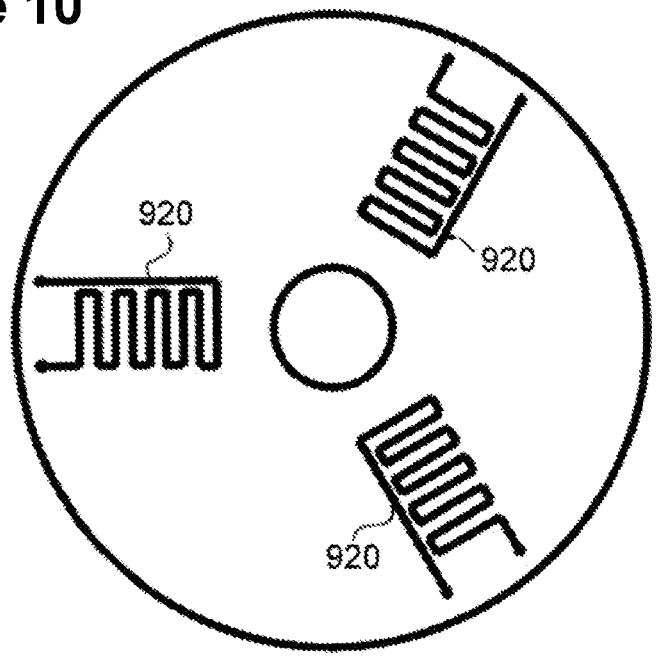
FIG. 10 shows a conductor track structure comprising a plurality of individually drivable conductor tracks in accordance with FIG. 9.

Firstly, FIG. 9 illustrates an individually drivable conductor track 920 having a meandering structure which covers an approximately rectangular region and the two ends of which are led out from the immersion cap 104 as connection contacts 920*b*, 920*c*. As shown in FIG. 10, the conductor track structure in this embodiment has a plurality of conductor tracks 920 of the type illustrated in FIG. 9. In this regard, in the example according to FIG. 10, three conductor tracks 920 are provided, which are distributed around the exit opening 112 at angular distances of 120°. With such resistance heating formed from the individually drivable conductor tracks 920, the immersion cap 104 can be heated to different extents at different locations, which can be advantageous for example if the thermal application is less effective at one of the aforementioned locations than at another location, for instance on account of the design of the immersion cap 104. Even under such conditions, homogeneous heating of the immersion medium 122 can thus be achieved.

Figure 11:
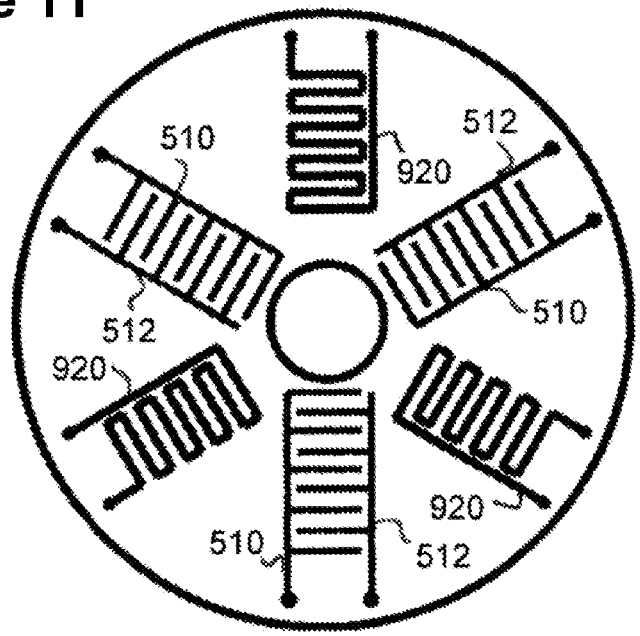
FIG. 11 shows a schematic illustration showing the spatial distribution of the electrode structure forming the sensor and of the conductor track structure intended for heating the immersion medium in one specific embodiment.

The schematic illustration according to FIG. 11 illustrates purely by way of example how the electrode structure intended for detecting the filling level of the immersion medium 122 and the conductor track structure functioning as resistance heating and optionally also as a temperature sensor can be jointly integrated in the immersion cap 104. In this regard, the aforementioned structures in the embodiment according to FIG. 11 are formed firstly by the electrode pairs 510, 512 in accordance with FIG. 5 and secondly by the conductor tracks 920 in accordance with FIG. 9 and are distributed with a mutual offset around the exit opening 112. Alternatively or additionally, it is also possible, for example, to arrange the two structures within the immersion cap 104 in two planes having an offset with respect to one another along the optical axis O of the objective 102.

Figure 12:
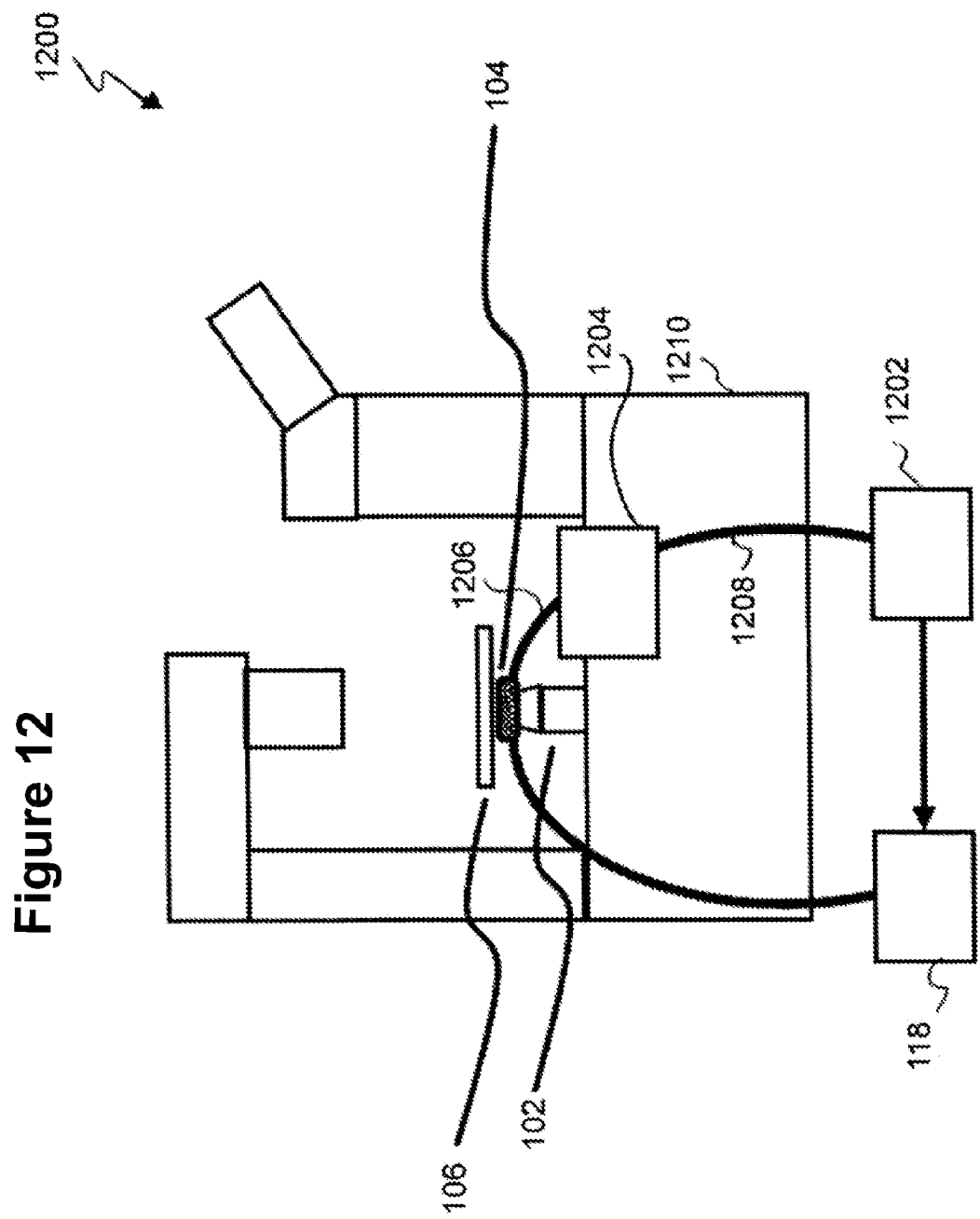
FIG. 12 shows a schematic illustration of a microscope in which the feed device for the immersion medium is usable.

FIG. 12 shows one exemplary embodiment of a microscope 1200, wherein the feed device 100 of the type explained above can be employed. The microscope 1200 according to FIG. 12 forms an inverse microscope, wherein the objective 102 is situated below the specimen 106. Besides the components already illustrated in FIG. 1, the microscope 1200 has an open-loop/closed-loop control unit 1202 embodied as a microcontroller, for example, and also an electronic measuring unit 1204, which is coupled firstly via a first connecting cable 1206 to the connection contacts of the electrode structure 302 forming the capacitive sensor 300, and secondly via a second connecting cable 1208 to the open-loop/closed-loop control unit 1202. It should be pointed out here that the illustration according to FIG. 12 is of a purely schematic type. In particular, the electronic measuring unit 1204 can also be arranged directly on the immersion cap 104, as has been explained further above with reference to FIG. 3. It is expedient in any case if the electronic measuring unit 1204 is situated as near as possible to the electrode structure 302, since the detection signal supplied by the electrode structure 302 is then largely insensitive to electromagnetic interference signals.

Figure 13:
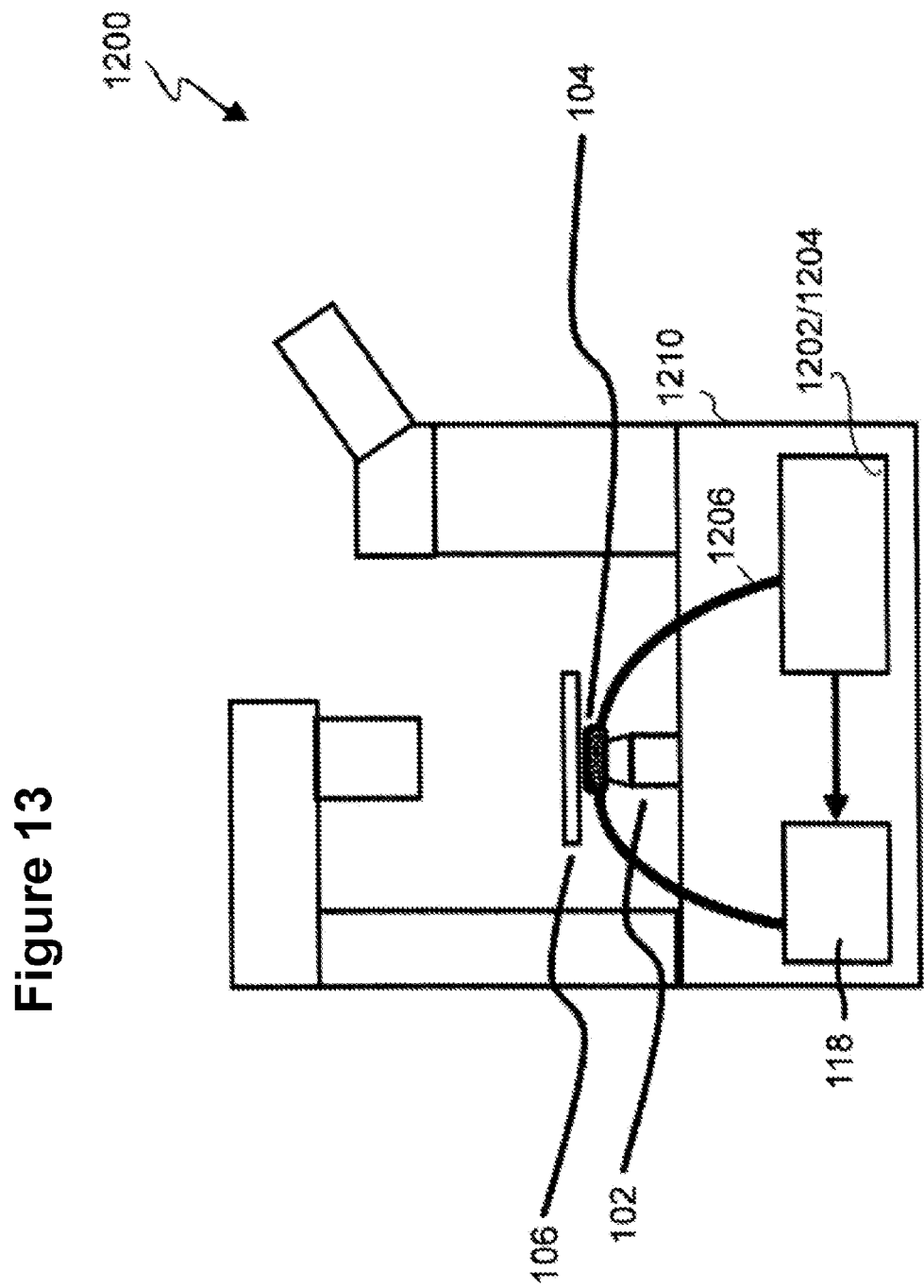
FIG. 13 shows a schematic illustration of the microscope in a modified embodiment.

In a modified embodiment illustrated in FIG. 13, the electronic measuring unit 1204 is integrated into the open-loop/closed-loop control unit 1202. It goes without saying, however, that this embodiment, too, should be understood to be purely by way of example.

Both the electronic measuring unit 1204 and the open-loop/closed-loop control unit 1202 can be arranged on the objective 102 or an objective turret. However, they can also be provided remote from the microscope 1200, as indicated in the embodiment according to FIG. 12, or be integrated into a microscope housing 1210, as indicated in the illustration according to FIG. 13.

The connection between the open-loop/closed-loop control unit 1202 and the electronic measuring unit 1204 can be embodied in a wired manner, preferably with low impedance, as provided in the embodiments according to FIGS. 12 and 13. In particular, a digital signal transmission is to be preferred here. However, it is likewise possible to transmit the detection signal wirelessly or optically from the electronic measuring unit 1204 to the open-loop/closed-loop control unit 1202.

The open-loop/closed-loop control unit 1202 shown in FIGS. 12 and 13 enables a user to operate the microscope 1200 as follows, for example. Firstly, the user communicates, via a suitable user interface, a command that causes the pump system 124 to pump the immersion medium 122 from the reservoir container 120 into the immersion cap 104. The user can thus set an amount—optimum for the respective experiment—of immersion medium 122 within the target space 134 between the immersion cap 104 and the specimen 106. At this moment the open-loop/closed-loop control unit 1202 receives from the measuring unit 1204 the detection signal of the capacitive sensor 300 and stores it. The open-loop/closed-loop control unit 1202 then drives the pump system 124 for a predetermined duration such that the desired amount of immersion medium 122 in the target space 134 is kept as constant as possible. In order to avoid continuously causing incremental movements in the immersion medium 122, it is advantageous here if the open-loop/closed-loop control unit 1202 prescribes a tolerance range around which the detection signal is permitted to change before the next corrective pump process is carried out. Furthermore, it is advantageous if the open-loop/closed-loop control unit 1202 permits pump processes only if the microscope 1200 is not currently carrying out an image recording of the specimen 106. By way of example, if a long-time experiment is carried out, in which the evaporation of the immersion medium 122 becomes relevant, the open-loop/closed-loop control unit 1202 can also prescribe time windows in order to schedule pump processes in the course of the experiment.

If the distance between the immersion cap 104 and the specimen 106 is altered during the experiment, for instance by means of a focusing process, then this inevitably results in an alteration of the contact area covered by the immersion medium 122 at the immersion cap 104 and/or the specimen 106. During such a change in distance realized, for example, by a corresponding open-loop control of a z-drive acting along the optical axis O of the objective 102, it is therefore expedient to interrupt the closed-loop control of the amount of immersion medium 122 until the z-drive has stopped for a minimum duration. On the basis of the detection signal of the sensor 300 that is then present, the closed-loop control can subsequently be restarted in order to achieve the desired amount of immersion medium 122.

An explanation is given below, with reference to the diagram according to FIG. 14, of a preferred method which makes it possible to carry out automatically an initial setting of an optimum amount of immersion medium 122. In this case, the diagram according to FIG. 14 shows the temporal profile of the detection signal output by the capacitive sensor 300 during a continuous measurement to the open-loop/closed-loop control unit 1202, said detection signal being designated by C.

Figure 14:
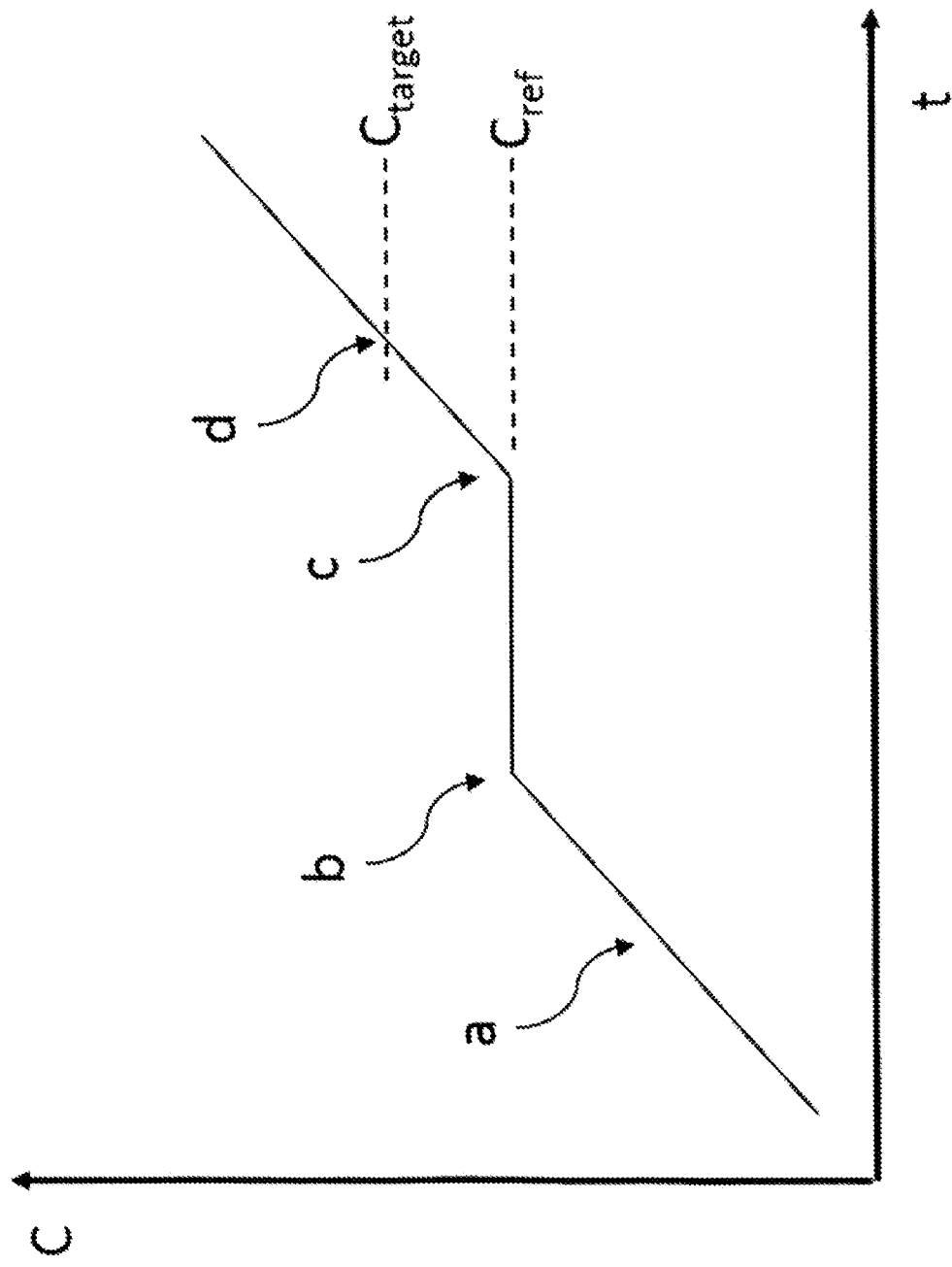
FIG. 14 shows a diagram showing an exemplary temporal profile of the detection signal detected by the sensor during the filling of the cap with immersion medium.

The starting point of the method illustrated in FIG. 14 is a situation in which there is no immersion medium 122 in the spatial detection region of the capacitive sensor 300. For the exemplary embodiment discussed here, this means that no immersion medium 122 is situated in the vicinity of the end wall 108 of the immersion cap 104. Proceeding from this state, the pump system 124 then begins to pump the immersion medium 122 into the immersion cap 104, preferably at a constant rate. Once the immersion medium 122 subsequently passes into the spatial detection region of the sensor 300, the detection signal C output by the sensor 300 begins to rise in accordance with section a in FIG. 14. The detection signal C subsequently rises until the immersion medium 122 passes into the region of the exit opening 112 of the immersion cap 104. For the present exemplary embodiment it is assumed here that the sensor 300 is embodied such that it is insensitive to the amount of immersion medium 122 situated in the exit opening 112. To that end, the sensor 300 has for example an electrode structure of the type shown in FIGS. 3 to 6. Owing to this insensitivity of the sensor 300 in relation to the exit opening 112, the detection signal C does not rise any further in the phase in which the exit opening 112 is gradually filled with the immersion medium 122. In this phase, which is bounded by the two points b and c in the diagram according to FIG. 14, the detection signal C thus remains constant at a value $C_{ref}$. It is only when the immersion medium 122 begins to aerially fill the target space 134 between the immersion cap 104 and the specimen 106 that the detection signal C rises continuously again proceeding from the point c, as is indicated by the section d in FIG. 14.

The open-loop/closed-loop control unit 1202 is configured such that it identifies the above-described pattern a-b-c-d in the profile of the detection signal C and determines the measurement value $C_{ref}$ in the range in which the detection signal C is constant. Consequently, the method described allows a defined state of the amount of immersion medium 122 to be linked with the absolute measurement value $C_{ref}$ as reference value. In particular, the reference value $C_{ref}$ determined in this way already incorporates all disturbance variables that otherwise hamper the capacitive measurement of the filling level. Such disturbance variables stem for example from the specific design of the objective 102 used or from the proximity of the capacitive sensor 300 to the specimen 106. On this basis it is thus possible to define an absolute target value $C_{target}$ for the optimum amount of immersion medium 122, this value being independent of the aforementioned disturbance variables. By way of example, the target value $C_{target}$ can be defined as follows:

$$C_{target}=C_{ref}+const., or$$

$$C_{target}=C_{ref} \times const.,$$

wherein const. represents an empirical constant.

If the detection signal C reaches the defined target value $C_{target}$, then the pump system and thus the continuous flow of the immersion medium 122 into the immersion cap 104 are stopped.

The method explained above also makes it possible, for example, for the immersion medium 122, after it has been pumped away during a change of specimen or objective, for instance, to be pumped into the target space 134 via the immersion cap 104 once again up to an optimum covering of the front lens 114 of the objective 102, without the alteration of the electromagnetic environment owing to the change of specimen or objective having a disadvantageous effect on the feed of the immersion medium 122.

The embodiments explained above should be understood to be purely by way of example. In this regard, in the explanation of these embodiments it has predominantly been assumed that the sensor for detecting the filling level of the immersion medium 122 is embodied as a capacitive sensor. However, it is likewise possible to use a resistive sensor. In particular, the electrode structures illustrated in FIGS. 4 to 7 are also applicable to a resistive sensor. It should merely be taken into consideration here that in contrast to the capacitive sensor embedded into the immersion cap material, the resistive sensor is exposed at a surface of the immersion cap in order to come into contact with the immersion medium 122.

Although some aspects have been described in the context of a device, it is clear that these aspects also constitute a description of the corresponding method, wherein a block or a device corresponds to a method step or a function of a method step. Analogously thereto, aspects described in the context of a method step also constitute a description of a corresponding block or element or a property of a corresponding device. Some or all of the method steps can be carried out by (or using) a hardware device, such as, for example, a processor, a microprocessor, a programmable computer or an electronic circuit. In some exemplary embodiments, one or more of the most important method steps can be carried out by such a device.

Depending on specific implementation requirements, exemplary embodiments of the invention can be implemented in hardware or software. The implementation can be carried out with a non-volatile storage medium such as a digital storage medium, such as, for example, a floppy disk, a DVD, a Blu-Ray, a CD, a ROM, a PROM and an EPROM, an EEPROM or a FLASH memory, on which are stored electronically readable control signals which cooperate (or can cooperate) with a programmable computer system such that the respective method is carried out. Therefore, the digital storage medium can be computer-readable.

Some exemplary embodiments according to the invention comprise a data carrier with electronically readable control signals which can cooperate with a programmable computer system, such that one of the methods described herein is carried out.

In general, exemplary embodiments of the present invention can be implemented as a computer program product having a program code, wherein the program code is effective for carrying out one of the methods when the computer program product is executed on a computer. The program code can be stored on a machine-readable carrier, for example.

Further exemplary embodiments comprise the computer program for carrying out one of the methods described herein, said computer program being stored on a machine-readable carrier.

In other words, one exemplary embodiment of the present invention is therefore a computer program having a program code for carrying out one of the methods described herein when the computer program is executed on a computer.

A further exemplary embodiment of the present invention is therefore a storage medium (or a data carrier or a computer-readable medium) comprising a computer program stored thereon for carrying out one of the methods described herein when it is executed by a processor. The data carrier, the digital storage medium or the recorded medium is generally tangible and/or not seamless. A further exemplary embodiment of the present invention is a device, as described herein, which comprises a processor and the storage medium.

A further exemplary embodiment of the invention is therefore a data stream or a signal sequence constituting the computer program for carrying out one of the methods described herein. The data stream or the signal sequence can be configured for example so as to be transmitted via a data communication connection, for example via the internet.

A further exemplary embodiment comprises a processing means, for example a computer or a programmable logic device, which is configured or adapted to carry out one of the methods described herein.

A further exemplary embodiment comprises a computer on which the computer program for carrying out one of the methods described herein is installed.

A further exemplary embodiment according to the invention comprises a device or a system configured to transmit (for example electronically or optically) a computer program for carrying out one of the methods described herein to a receiver. The receiver can be for example a computer, a mobile device, a storage device or the like. The device or the system can comprise for example a file server for transmitting the computer program to the receiver.

In some exemplary embodiments, a programmable logic device (e.g. a field programmable gate array, FPGA) can be used to implement some or all of the functionalities of the methods described herein. In some exemplary embodiments, a field programmable gate array can cooperate with a microprocessor in order to carry out one of the methods described herein. In general, the methods are preferably carried out by any hardware device.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Feed device
102 Objective
104 Immersion cap
106 Specimen
108 End wall
110 Cylindrical wall
112 Exit opening
114 Front lens
116 Lens system
118 Supply system
120 Reservoir container
122 Immersion medium
124 Pump system
126 Tube
127 Tube
128 Receptacle space
130 Edge of the end wall
132 Gap
134 Target space
136 Outer surface of the end wall
300 Capacitive sensor
302 Electrode structure
306 Feed opening
410 Electrode
410a Electrode section
410b Connection contact
412 Electrode
412a Electrode section
412b Connection contact
510 Electrode
510a Electrode section
510b Connection contact
512 Electrode
512a Electrode section
512b Connection contact
602 Electrode structure
710 Electrode
710a Electrode section
712 Electrode
712a Electrode section
820 Conductor track
820a Conductor track section
820b Connection contact
820c Connection contact
920 Conductor track
920a Conductor track section
920b Connection contact
920c Connection contact
1200 Microscope
1202 Open-loop/closed-loop control unit
1204 Electronic measuring unit
1206 Connecting cable
1208 Connecting cable
1210 Microscope housing
K1,K2 Boundary lines of the target space
R1,R2,R3,R4 Subregions
C Detection signal
$C_{ref}$ Reference value
$C_{target}$ Target value
T Time

What is claimed is:

1. A feed device for an immersion medium for use with an objective enabling a specimen to be imaged microscopically, the feed device comprising:
a cap fitted releasably or fixedly to the objective and delimiting a receptacle space for the immersion medium, the cap having an exit opening aligned with an optical element of the objective facing the specimen, the immersion medium held in the receptacle space being feedable through the exit opening to a target space situated between the optical element of the objective and the specimen, and
a sensor integrated in the cap and having an electrode structure configured to detect an amount of the immersion medium fed through the exit opening to the target space, the electrode structure at least partly enclosing the exit opening and having a spatial detection region extending away from the exit opening in a radial direction.

2. The feed device as claimed in claim 1, wherein the sensor is a capacitive or resistive sensor.

3. The feed device as claimed in claim 1, wherein the electrode structure of the sensor is insensitive to an amount of the immersion medium situated in the exit opening.

4. The feed device as claimed in claim 1, wherein the electrode structure of the sensor is sensitive to an amount of the immersion medium situated in the exit opening.

5. The feed device as claimed in claim 1, wherein electrode structure is embodied as an interdigitated structure.

6. The feed device as claimed in claim 1, wherein the exit opening is circular and the electrode structure is embodied rotationally symmetrically with respect to the exit opening.

7. The feed device as claimed in claim 1, wherein the electrode structure has a plurality of mutually independently drivable electrode pairs distributed around the exit opening.

8. The feed device as claimed in claim 1, further comprising a measuring unit for the sensor, the measuring unit being integrated into the cap.

9. The feed device as claimed in claim 1, wherein an edge of an end wall of the cap delimiting the exit opening, together with the optical element of the objective, forms a gap through which the immersion medium emerges into the target space.

10. The feed device as claimed in claim 1, wherein an end wall of the cap extends substantially conically toward the exit opening.

11. The feed device as claimed in claim 1, wherein the cap has a substantially cylindrical wall adjacent to an end wall of the cap, the cylindrical wall together with the end wall delimiting the receptacle space for the immersion medium.

12. An objective comprising the feed device as claimed in claim 1.

13. The feed device as claimed in claim 1, wherein the cap has an end wall facing the specimen, the exit opening being formed in the end wall, wherein the end wall separates the receptacle space from the target space and wherein the electrode structure is integrated into the end wall.

14. The feed device as claimed in claim 13, wherein the end wall has a first material layer, which electrically insulates the electrode structure of the sensor from the receptacle space, and a second material layer, which electrically insulates the electrode structure of the sensor from the target space.

15. The feed device as claimed in claim 13, wherein the end wall electrically insulates the electrode structure of the sensor firstly from the receptacle space and secondly from the target space in such a way that the spatial detection region of the electrode structure covers at least the entire target space.

16. The feed device as claimed in claim 15, wherein the spatial detection region of the electrode structure also covers the receptacle space.

17. The feed device as claimed in claim 1, further comprising a conductor track structure integrated in the cap, the conductor track structure being electrically insulated from the receptacle space and the target space and being configured to resistively heat the immersion medium.

18. The feed device as claimed in claim 17, wherein the conductor track structure follows a winding course.

19. The feed device as claimed in claim 17, further comprising a temperature sensor configured to detect a temperature of the immersion medium.

20. The feed device as claimed in claim 19, wherein the temperature sensor is formed by the conductor track structure, which has a predetermined, temperature-dependent electrical resistance and is configured, alternately over time, to resistively heat the immersion medium held in the receptacle space and to resistively detect the temperature of the immersion medium.

21. The feed device as claimed in claim 1, further comprising a pump system, which is connected to the receptacle space of the cap via at least one tube and is configured to pump the immersion medium into the receptacle space.

22. The feed device as claimed in claim 21, further comprising an open-loop/closed-loop control unit configured to pump the immersion medium into the receptacle space depending on a detection signal supplied by the sensor.

23. A method for feeding an immersion medium using the feed device as claimed in claim 22, the method comprising:
pumping the immersion medium into the receptacle space by the pump system;
simultaneously generating, by the sensor, a detection signal corresponding to the amount of the immersion medium fed through the exit opening to the target space; and
controlling the pump system to set a target amount of the immersion medium based on the detection signal.

24. The method as claimed in claim 23, wherein the immersion medium is pumped into the receptacle space at a constant pump rate.

25. The method as claimed in claim 23, wherein, for defining the target amount of the immersion medium, firstly an amount for which the immersion medium reaches the exit opening of the cap is detected as a reference amount of the immersion medium and then the target amount of the immersion medium is determined based on the reference amount of the immersion medium.

26. The method as claimed in claim 23, wherein the target amount of the immersion medium is kept constant using a closed-loop control circuit.

27. The method as claimed in claim 26, wherein the closed-loop control of the amount of immersion medium fed through the exit opening to the target space is suspended within a predetermined tolerance range around the target amount of the immersion medium and/or when a predetermined operating state is present.

* * * * *